United States Patent [19]
Sacristan

[11] Patent Number: 5,732,557
[45] Date of Patent: Mar. 31, 1998

[54] MASTER CYLINDER WITH SIMPLIFIED ADJUSTMENT

[76] Inventor: Fernando Sacristan, 126 Rue De Stalingrad, Drancy, France, 93700

[21] Appl. No.: 702,680
[22] PCT Filed: Jul. 23, 1996
[86] PCT No.: PCT/FR96/01159
 § 371 Date: Aug. 16, 1996
 § 102(e) Date: Aug. 16, 1996
[87] PCT Pub. No.: WO97/11870
 PCT Pub. Date: Apr. 3, 1997

[30] Foreign Application Priority Data

Sep. 27, 1995 [FR] France ................... 95 11303

[51] Int. Cl.[6] ........................................ B60T 11/20
[52] U.S. Cl. ............................................... 60/562
[58] Field of Search ............................... 60/562

[56] References Cited

U.S. PATENT DOCUMENTS

| | | | |
|---|---|---|---|
| 3,147,596 | 9/1964 | Wallace | 60/562 |
| 3,355,887 | 12/1967 | Balster | 60/562 |
| 3,357,183 | 12/1967 | Krieger | 60/562 |
| 3,393,514 | 7/1968 | Cripe | 60/562 |
| 4,685,301 | 8/1987 | Bacardit et al. | 60/562 |
| 5,036,664 | 8/1991 | Camm | 60/589 |
| 5,044,161 | 9/1991 | Schiel et al. | 60/562 |
| 5,161,376 | 11/1992 | Hartmann | 60/562 |
| 5,191,765 | 3/1993 | Ruehl | 60/581 |

Primary Examiner—F. Daniel Lopez
Attorney, Agent, or Firm—Leo H. McCormick, Jr.

[57] ABSTRACT

A master cylinder having primary (2) and secondary (3) pistons mounted in tandem within a bore (100) of a body (1). The bore (100) being closed by a detachable bottom such that first (7a) and second (7b) springs act on the primary (2) and secondary (3) pistons to define first (6a) and second (6b) hydraulic chambers. The first spring (7a) being contained within a cage. The cage being comprised of a rigid cup (8) and a spacer (10) which passes through the secondary, piston (3). The spacer (10) being accessible from the secondary pressure chamber (6b) to enable adjustment of the length (L) of the cage by relative displacement of the spacer (10) and the secondary piston (3).

4 Claims, 1 Drawing Sheet

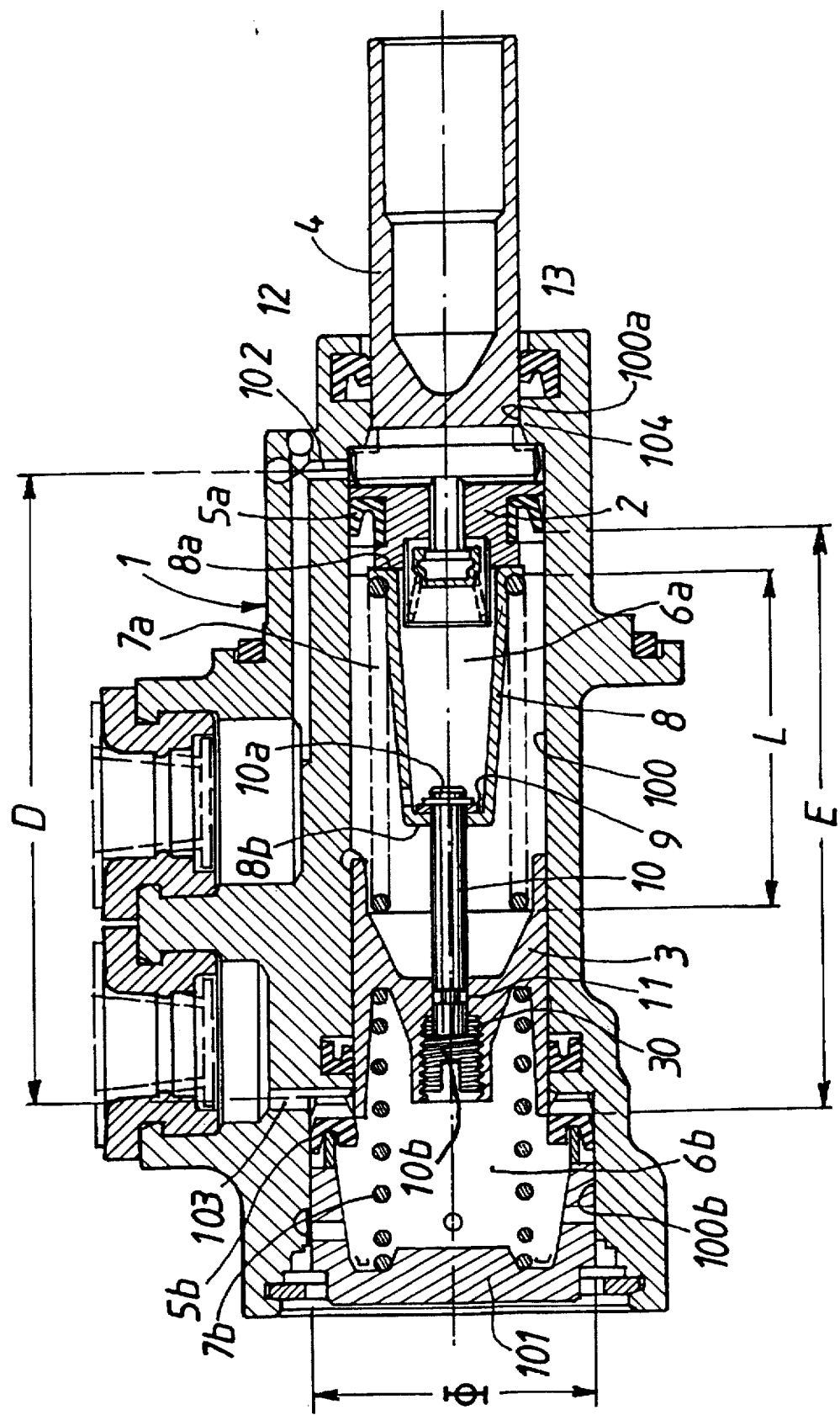

MASTER CYLINDER WITH SIMPLIFIED ADJUSTMENT

The present invention relates to a hydraulic tandem master cylinder comprising: a body formed with a bore which is at least partially cylindrical and of which one end forms an opening and a second end is closed by a bottom formed by a detachable part, this bore comprising two fluid feed ducts spaced apart one from the other by a defined distance; a primary piston and a secondary piston arranged to slide in the bore, the primary piston being connected to an actuating rod which passes through the opening, and the primary piston and the secondary piston presenting together a defined effective overall size; a primary pressure chamber defined in the bore between the primary and secondary pistons, this chamber containing at least a first spring which is confined in a space of defined maximal length and which exerts between the pistons a first spring force which urges them apart from each other; a secondary pressure chamber defined in the bore between the secondary piston and the bottom, this chamber containing at least a second spring which exerts between the secondary piston and the bottom a second spring force in a direction which urges this secondary piston away from the bottom; first and second sealing elements, co-operating respectively with the primary and secondary pistons, to ensure sealing of the primary and secondary pressure chambers respectively; at least one guide means for the actuating rod, provided adjacent the opening; and adjustment means accessible from the vicinity of the second end of the body, to enable adjustment one relative to the other of the defined distance and the defined effective overall size.

BACKGROUND OF THE INVENTION

A master cylinder of this type is described for example in the document FR-A-2 312 399.

One of the difficulties which have to be overcome in the manufacture of tandem master cylinders is to succeed in reducing both their cost and their overall size, a man skilled in the art finding these two requirements somewhat mutually contradictory to the extent that currently known solutions for ensuring a reduction in overall length oblige the tandem master cylinder to be made of a large number of parts, especially in view of its adjustment, and therefore at a higher cost.

SUMMARY OF THE INVENTION

The object of the present invention is to provide a tandem master cylinder in which both the overall size and the cost of manufacture, particularly the cost of adjustment, are simultaneously reduced.

To this end, the tandem master cylinder of the invention is essentially characterised in that the first spring is retained within a cage which constitutes the space of defined maximal length, in that the cage comprises a rigid cup of which a peripheral part presents a purchase for the first spring in the vicinity of the primary piston and of which a central part is retained by a stop, in that the stop is solid with a first end of a spacer which passes slidingly through the cup and of which a second end screwed in the secondary piston, and in that the adjustment means are accessible from the secondary pressure chamber and cooperate with the spacer to enable an adjustment of the defined maximal length of the cage by relative displacement of the spacer and of the secondary piston.

Moreover, according to a preferred embodiment of the invention, the bore presents a diameter which reduces stepwise from the bottom of this bore until the opening, the first seal is borne by the primary piston, the second seal is accommodated in the bore, and the opening of the bore takes the form of a shoulder, which itself constitutes the guide means for the actuating rod.

The overall size of the master cylinder of the invention may be further reduced by arranging that a first one of the two fluid feed ducts opens into the bore between the shoulder of the bore and the primary pressure chamber, and that the primary piston has a non return valve passing through it which enables flow from the first fluid feed duct into the primary pressure chamber.

The adjustment means comprises, for example, a screw thread formed in the secondary piston and a threaded cylindrical screw head, engaged in the screw thread, the spacer having a generally cylindrical shape and passing sealingly through the secondary piston.

BRIEF DESCRIPTION OF THE DRAWING

Other features and advantages of tile invention will appear more clearly from the following description thereof, given by way of indication and not as limitation, with reference to the single figure, which is a sectional view of a tandem master cylinder produced in accordance with the invention.

DETAILED DESCRIPTION OF THE INVENTION

The tandem master cylinder of the invention comprises essentially, in the usual way, a body 1 within which is formed a bore 100 which at least partially cylindrical, whose first end 100a forms an opening, and whose second end 100b is closed by a bottom 101 constituted by a detachable part.

The bore 100 comprises two hydraulic fluid feed ducts, 102 and 103, which are spaced apart from each other by a defined distance D.

A primary piston 2 and a secondary piston 3 are accommodated in the bore 100 in such a way as to be able to slide therein by actuation of an actuating rod 4 which passes through the opening 100a and is arranged to displace the primary piston 2.

With the aid of a first seal member 5a, the primary piston 2 defines within the bore 100 the limits of a primary pressure chamber 6a within which is accommodated at least a first spring 7a.

The spring 7a is constrained within a space of maximal length L, and exerts between the piston 2 and 3 a first spring force which urges these pistons apart one from the other.

With the aid of a second seal member 5b, the secondary piston 3 defines within the bore 100 the limits of a secondary pressure chamber 6b within which is accommodated at least a second spring 7b exerting between the secondary piston 3 and the bottom 101 a second spring fierce in a direction which urges this secondary piston away from the bottom.

The primary and secondary pistons together present an overall effective size E.

In according with the invention, the first spring 7a is contained within a cage which constitutes the space of maximal length L, and means for adjustment, accessible from the secondary pressure chamber 6b are provided to enable the adjustment relative to one another of the distance D by which the fluid feed ducts 102 and 103 are spaced apart and the effective overall size E of the assembly of the primary and secondary pistons 2 and 3, by means of a variation of the length L of the cage.

In more detail, the cage comprises a rigid cup 8, of which a peripheral part 8a presents a bearing surface for the first spring 7a and itself bears on the primary piston 2 under the effect of the second spring force exerted by the second spring 7b.

A central part 8b of the cup 8 is retained by a stop 9 which is solid with a first end 10a of a spacer 10 which passes slidingly through the cup 10 and of which a second end 10b screwed in the secondary piston 3.

The means for adjustment, which co-operate with the spacer 10 to enable a relative displacement of the spacer and of the secondary piston 3, comprise for example a screw thread 30 formed in the secondary piston 3 and a threaded cylindrical screw head formed by the second end 10b of the spacer, engaged in the screw thread 30, the spacer being otherwise generally of cylindrical shape and its passage through the secondary piston 3 being made fluid tight by a seal 11.

According to a possible variant embodiment of the invention, the threaded cylindrical screw head 10b and the screw thread 30 could respectively be replaced by a smooth cylindrical screw head and a simple bore, by providing that the stop 9 be replaced by a nut held against rotation by the cup 8, and that the end 10a of the spacer be threaded to receive this nut.

As shown in the figure, the bore 100 presents a diameter Ø which reduces stepwise from the bottom 101 of this bore towards its opening 100a, this opening taking the form of a shoulder 104 which itself constitutes a means for guiding the actuating rod 4.

Such an arrangement makes it possible to arrange that the first seal 5a is borne by the primary piston, and that the second seal 5b is accommodated in the bore, which leads to a minimal overall size of the pistons.

Lastly, the first fluid feed duct 102 opens into the bore 100 between the shoulder 104 of the bore and the primary pressure chamber 6a, and the primary piston 2 has a non return valve 12 passing through it to enable the flow of hydraulic fluid from the first fluid feed duct 102 into the primary pressure chamber 6b, this non return valve being actuated by a transverse stop 13 which passes through the rod 4 and bears on the shoulder 104 to open the non return valve in the rest position of the primary piston 2, as illustrated in the figure.

I claim:

1. A hydraulic tandem master cylinder comprising:

a body formed with a bore which is at least partially cylindrical and of which one end forms an opening and a second end is closed by a bottom formed by a detachable part, said bore comprising two fluid feed ducts spaced one from the other by a defined distance;

a primary piston and a secondary piston arranged to slide in said bore, said primary piston being connected to an actuating rod which passes through said opening, said primary piston and said secondary piston presenting together a defined effective overall size;

a primary pressure chamber defined in said bore between said primary and secondary pistons, said primary pressure chamber containing at least a first spring which is confined in a space of defined maximal length and which exerts between said pistons a first spring force which urges said pistons apart from each other;

a secondary pressure chamber defined in said bore between said secondary piston and said bottom, said secondary pressure chamber containing at least a second spring which exerts between said secondary piston and said bottom a second spring force in a direction which urges said secondary piston away from said bottom;

first and second sealing elements, co-operating respectively with said primary and secondary pistons, to ensure sealing of said primary and secondary pressure chambers respectively;

at least one guide means for said actuating rod, provided adjacent said opening; and adjustment means accessible from the vicinity of said second end of said body, to enable adjustment relative to one another of said defined maximal length and said defined effective overall size, character lead in that said first spring is retained within a cage which constitutes the space of defined maximal length, said cage comprising a rigid cup of which a peripheral part presents a bearing surface for the first spring in the vicinity of the primary piston and of which a central part is retained by a stop, said stop being solid with a first end of a spacer which passes slidingly through said cup and of which a second end is screwed into said secondary piston, said adjustment means being accessible from said secondary pressure chamber and co-operate with said spacer to enable an adjustment of the defined maximal length of the cage by relative displacement of said spacer and said secondary piston.

2. The master cylinder according to claim 1, characterised in that said bore has a diameter which reduces stepwise from the bottom of said bore toward said opening, said first seal being borne by said primary piston, said second seal being accommodated in said bore, said opening of said bore takes a form of a shoulder, said shoulder constituting said guide means for said actuating rod.

3. The master cylinder according to claim 2, characterised in that a first of said two fluid feed ducts opens into said bore between said shoulder of said bore and said primary pressure chamber, a non return valve passing through said primary piston and enabling flow from said first fluid feed duct into said primary pressure chamber.

4. The master cylinder according to claim 1, character lead in that said adjustment means comprises a screw thread formed in said secondary piston and a threaded cylindrical screw head which engages in said screw thread, said spacer having a generally cylindrical shape and passing sealingly through said secondary piston.

\* \* \* \* \*